United States Patent [19]

Siri

[11] 4,366,017
[45] Dec. 28, 1982

[54] PROCESS AND APPARATUS FOR CONTINUOUSLY APPLYING REINFORCING TAPES FROM SYNTHETIC RESIN, ON THE LONGITUDINAL SIDES OF PLASTIC SHEETS

[76] Inventor: Bruno G. Siri, Via Oreglia 25, I-18015 Riva Ligure (Imperia), Italy

[21] Appl. No.: 239,060

[22] Filed: Feb. 27, 1981

[30] Foreign Application Priority Data

Mar. 28, 1980 [IT] Italy .................. 67479 A/80

[51] Int. Cl.³ ........................................... B29D 23/05
[52] U.S. Cl. .................................. 156/244.11; 47/26; 47/28 R; 156/244.12; 156/244.13; 156/244.25; 156/244.27; 156/250; 156/500; 156/510; 156/513
[58] Field of Search ...................... 156/244.11, 244.12, 156/244.13, 244.25, 250, 500, 510, 513, 244.27; 428/77, 81, 83, 99, 121, 123, 188, 192; 47/29, 28 R, 26, 17

[56] References Cited

U.S. PATENT DOCUMENTS

| | | | |
|---|---|---|---|
| 2,251,624 | 8/1941 | Foree et al. | 47/28 |
| 2,708,771 | 5/1955 | Stoneback | 156/244.12 |
| 3,540,975 | 11/1970 | Wright et al. | 156/244.25 |
| 3,769,747 | 11/1973 | Chapman | 428/121 |
| 3,784,432 | 1/1974 | Noguchi | 156/244.25 |
| 3,904,468 | 9/1975 | Noguchi | 156/244.25 |
| 4,044,501 | 8/1977 | Frydryk | 47/26 |

Primary Examiner—Caleb Weston
Attorney, Agent, or Firm—Keil & Witherspoon

[57] ABSTRACT

This invention relates to a process of continuously applying reinforcing tapes from synthetic resin on the longitudinal sides of plastic sheets, an apparatus for carrying out said process, a product obtained by means of said process and one application of said product.

The apparatus according to the invention comprises: a roller support (1) from which the starting plastic sheet (2) is continuously rolled; a first series of rollers (3) on which said sheet (2) is advanced; at least two extruders (4) whose extruder heads (4a) are each in face-to-face relationship to the longitudinal sides of said sheet above the plane formed by the first series of rollers (3); at least two punches (7); at least one pressure roller (8) cooperating with one of said rollers (3); a second series (9) of rollers feeding said sheet (2), said rollers being disposed in a plane lying at a level lower than that of rollers (3) and being placed in a tank (10) containing coolant water; and a second roller support (12) on which said sheet is rolled once the process is completed.

Application to the manufacture of plastic sheets adapted to serve as protective coverings for rows of vines or for floriculture.

2 Claims, 6 Drawing Figures

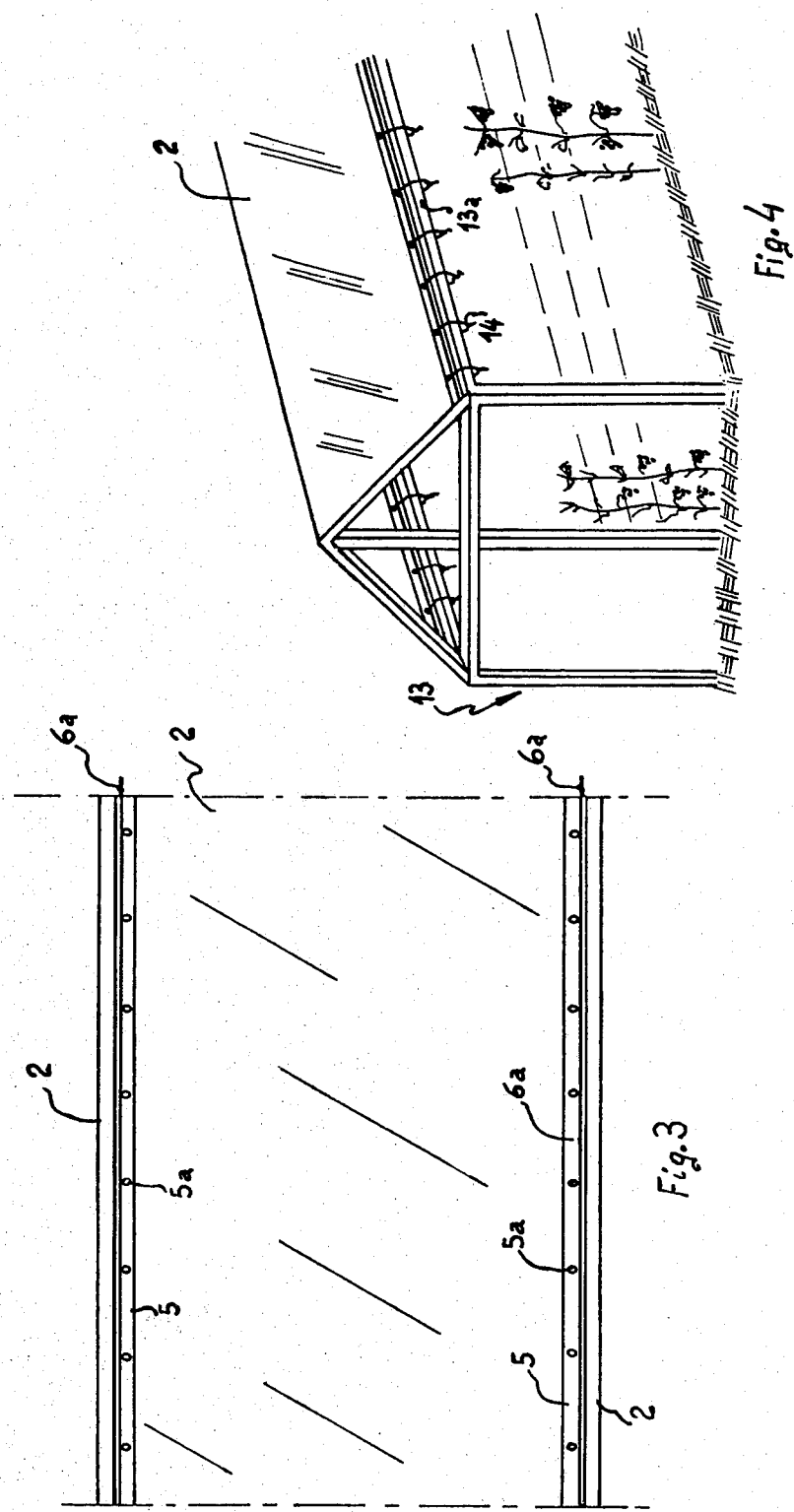

PROCESS AND APPARATUS FOR CONTINUOUSLY APPLYING REINFORCING TAPES FROM SYNTHETIC RESIN, ON THE LONGITUDINAL SIDES OF PLASTIC SHEETS

This invention relates to a process for continuously applying reinforcing tapes from synthetic resin, provided with an armature, on the longitudinal sides of plastic sheets, particularly for use as protective coverings for rows of vines or for floriculture greenhouses. The invention also relates to an apparatus for carrying out said process, to the product obtained by means of said process, and to the use of said product.

Particularly in areas where white grapes are cultivated, e.g., muscate grapes which are marketed as table grapes before the year-end festivities, it is very useful and advantageous to keep the grapes attached to the vines that produce them until that time. For this purpose, attempts have been made to protect the vines and the grapes attached thereto from atmospheric agents and from the cold by providing devices designed to protect the vines proper.

The invention has in view covering devices for the protection of vines and the grapes attached thereto, as well as for the protection of floriculture greenhouses, said devices being dependable and easy to use and capable of being manufactured on an industrial scale.

More specifically, an object of the invention is to provide a process for continuously applying tapes from synthetic resin, provided with a reinforcing armature, on the longitudinal sides of plastic sheets particularly for use as a protective covering for rows of vines or for floriculture greenhouses.

Another object of the invention is to provide a simplified apparatus for carrying out said manufacturing process as well as the product obtained by means of said process.

The process embodying the principles of the invention is characterized in that it essentially consists in continuously unrolling a plastic sheet from a roller support; in continuously routing said plastic sheet in a plane situated below two extruder heads, one of said extruder heads facing one longitudinal side of said plastic sheet and the other extruder head facing the other longitudinal side of said plastic sheet; in continuously feeding the extruders of said two extruder heads with thermoplastic material; in continuously extruding through each of said two extruder heads a flexible tubing from plastic sheet; in continuously rolling from a bobbin (one bobbin per extruder head) a metal (preferably iron) wire; in continuously feeding said iron wire into said flexible tubing from plastic sheet; in routing said flexible tubing from extruded plastic sheet (one tubing for each of said two extruder heads) with the iron wire inserted therein simultaneously on one and the other of the two longitudinal sides of the plastic sheet; in passing said flexible plastic tubing (applied with the iron wire inserted therein on one and the other of the two longitudinal sides of the plastic sheet) underneath a punch synchronized to function with the forward movement of the plastic sheet and punching on the side lying on the inside with respect to the iron wire inserted in the flexible plastic tubing, at specified intervals, holes or eyelets in said flexible plastic tubing and in the underlying plastic sheet on which said flexible tubing is applied; in routing said plastic sheet (with the flexible plastic tubing applied in the form of a tape with the iron wire inserted therein on one and the other of the two longitudinal sides) between pressure rollers so as to bring about the cohesion; in continuously passing said plastic sheet with the flexible plastic tubing having the iron wire inserted therein and applied in the form of a tape on the two longitudinal sides through a bath of coolant water; and, finally, in continuously rolling said plastic sheet with the flexible plastic tubing having the iron wire inserted therein and applied in the form of a tape on its two longitudinal sides on a receiving-roller type support.

The device for implementing this process is essentially characterized in that it consists of a roller support from which the starting plastic sheet is unrolled continuously; a first set of monoplane rollers on which said starting plastic sheet is routed; at least two extruders in symmetrical face-to-face relationship to one another, one extruder being disposed on one side and the other extruder on the other side of the two longitudinal sides of said starting plastic sheet and whose extruder heads are disposed (one extruder head facing one longitudinal side and the other facing the other longitudinal side of said starting plastic sheet) above the plane formed by said first set of rollers; at least two punches disposed (one punch facing one longitudinal side and the other punch facing the other longitudinal side of said plastic sheet) above said sides and are preferably in symmetrical face-to-face relationship to one another and synchronized to function with the feed of said starting plastic sheet; at least one pressure roller acting to provide pressure in conjunction with one of the rollers of said first set of rollers; a second set of rollers to feed said plastic sheet and lying in a plane lower than the plane in which are disposed the rollers of said first set of rollers and which are situated in a tank containing coolant water; at least one additional roller to feed said plastic sheet and lying in a plane higher than the plane in which the rollers of said second set of rollers are located; and, finally, an additional roller support on which the plastic sheet is rolled continuously once the process is completed, the roller of said additional roller support being driven by a motive force.

The invention will now be described by way of illustrative example with reference to practical embodiments of the invention shown in the drawings, in which:

FIGS. 1a and 1b are detail views, on a larger scale, of the device illustrated in FIG. 1;

FIG. 3 is a plan view of a segment of the plastic sheet obtained with the process advocated by the invention; and FIG. 4 is an example of how the product obtained with the invention is installed.

Figure 1:
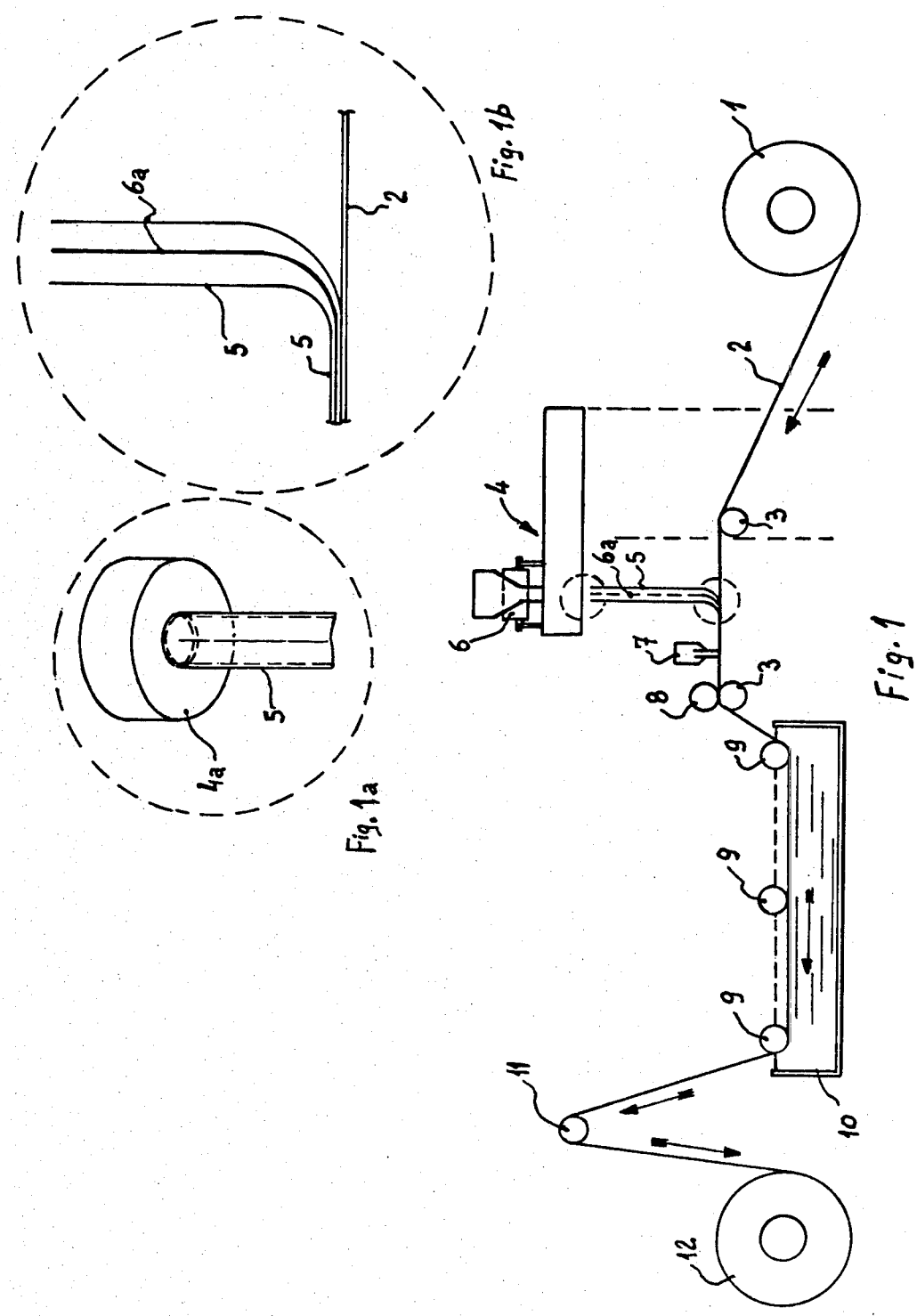
FIG. 1 is a schematic view in longitudinal elevation showing the steps of the process provided by the invention, as well as the device for carrying out said process.
Figure 2:
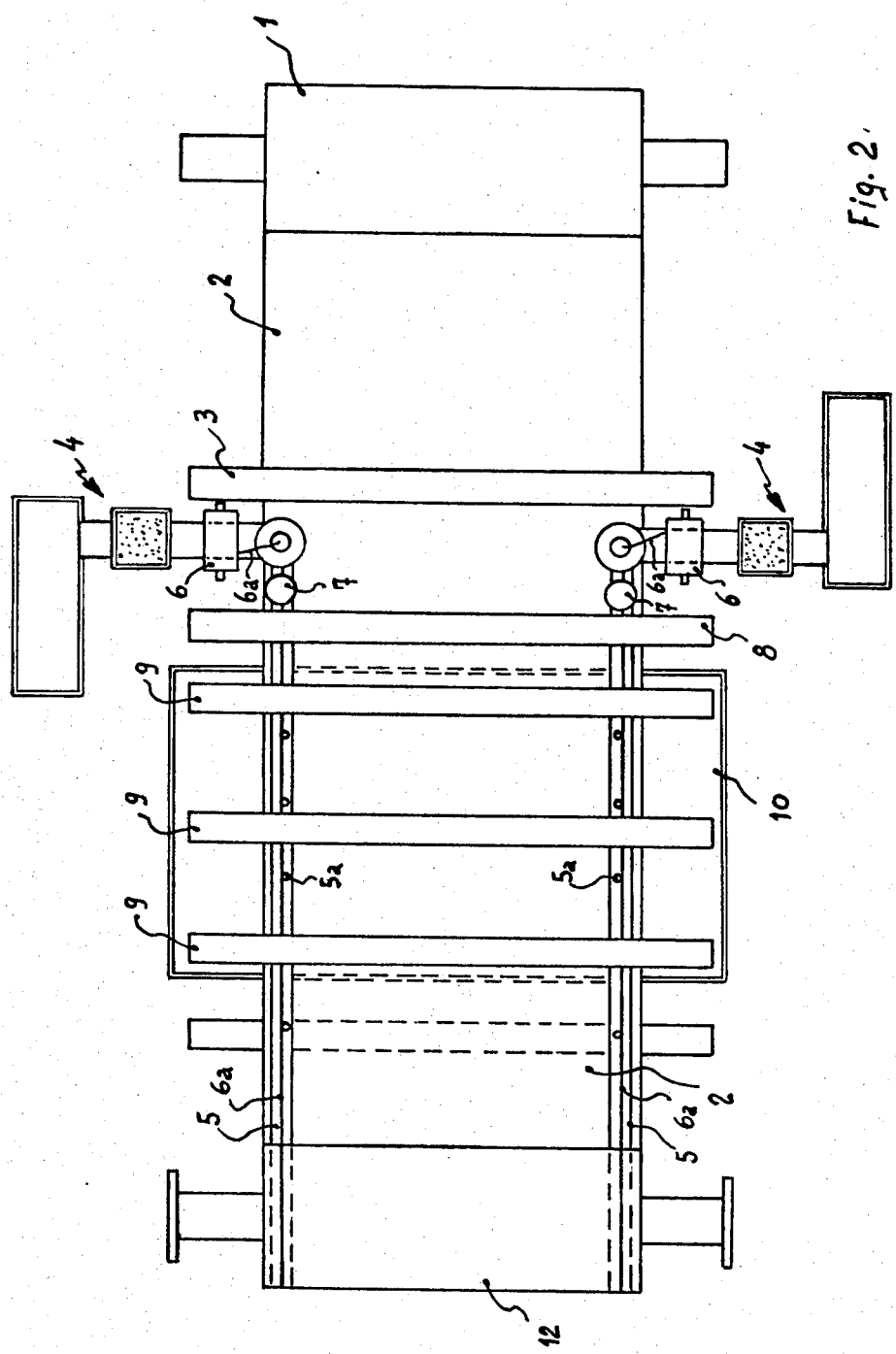
FIG. 2 is a plan view of said device.

Now, referring to the drawings, reference numeral 1 designates a roller support from which the starting plastic sheet 2 is unrolled continuously. Said starting plastic sheet 2 is continuously routed on a first set of rollers 3 lying in a plane below the two extruder heads 4a of the two extruders 4. Said two extruders are in a symmetrical face-to-face relationship to one another, one lying on one side and the other on the other side of the two longitudinal sides of the starting plastic sheet 2, their extruder heads 4a being disposed, respectively, one opposite one longitudinal side and the second one opposite the other longitudinal side of said starting plastic sheet 2 and above the plane formed by said first set of rollers 3. A flexible tubing 5 from plastic sheet is continuously extruded through said two extruder heads 4a. Reference numeral 6 indicates two bobbins of wire, preferably iron wire, one being arranged near one of the two extruder heads 4a and the other near the other extruder head. The iron wire 6a wound on said bobbins 6 is continuously fed into the flexible tubing 5 from plastic sheet at the same time that said flexible tubing issues from the two extruder heads 4a. The flexible tubing 5 from plastic sheet issuing from the two extruder heads 4a with the iron wire 6a inserted therein is routed on one and the other of the two longitudinal sides of the starting plastic sheet 2 (FIG. 1b). The flexible tubing 5 from plastic sheet issuing from one and the other of the two extruder heads 4a with the metal wire 6a inserted therein is applied in the form of a tape on one and the other of the two longitudinal sides of the starting plastic sheet 2 (FIG. 1b). Reference numeral 7 denotes two punches, one facing one longitudinal side and the other facing the other longitudinal side of the starting plastic sheet 5, both punches lying above said sheet in symmetrical face-to-face relationship to one another. Said punches 7 are synchronized to function with the forward movement of plastic sheet 2. At the same time that the starting plastic sheet 2 moves forward, the punches 7 punch in the flexible plastic tubing 5 and in the underlying starting sheet 2 on which they are applied in the form of tapes, holes or eyelets 5a spaced a distance from one another on the side lying on the inside with respect to the iron wire 6 inserted in said flexible plastic tubings 5. Reference numeral 8 indicates a pressure roller which acts to apply pressure in conjunction with one of the rollers of the first set of rollers 3 (FIGS. 1 and 2). The starting plastic sheet 2, which is continuously fed with the flexible plastic tubings 5 thereon applied in the form of a tape and containing the iron wire 6a on one and the other of its two longitudinal sides, is passed through said two pressure rollers 8 and 3 so as to bring about the cohesion. Reference numeral 9 indicates a second set of rollers to feed the starting plastic sheet 2. Rollers 9 of this second set of rollers lie in a plane which is lower than the plane in which rollers 3 of the first set are located, said rollers 9 being placed in a tank containing coolant water 10 (FIGS. 1 and 2) in which the starting plastic sheet 2 is passed through. Reference numeral 11 denotes another roller to feed the starting plastic sheet 2. Said roller 11 lies in a plane which is higher than the plane of rollers 9 of the second set of rollers. Reference numeral 12 indicates another roller support on which the plastic sheet 2 is continuously rolled once the process is completed. Said other roller support 12 is driven by a motive force such as, for example, an electric motor not shown herein.

When all of the plastic sheet 2 is unrolled from the roller support 1 and, in conformity with the process described above, is completely rolled on the receiving roller support 12, the empty roller support 1 is replaced by a corresponding roller support on which is rolled another starting plastic sheet 2 to be processed, the empty roller support 1 being employed in the place of the receiving roller support 12 adapted to roll the plastic sheet 2 processed in accordance with the above described process, and so on.

To install the product obtained on the basis of this invention such as, for example, a covering means for the protection of vines and the grapes attached thereto, the procedure is as follows:

First, from the roller support on which the plastic sheet obtained by this invention is rolled a segment of specified length of said plastic sheet, e.g., 50 to 100 meters, corresponding to the length of the protective covering desired, is cut transversely (FIG. 3), detaching it from the rest, which remains rolled on said roller support, and arranging it on the prefabricated supporting framework 13, generally from wood (FIG. 4) and adapted to support the covering; strong thread-like fastening elements 14 are passed through the holes or eyelets 5a arranged on the inside with respect to the iron wire 6a on each reinforced longitudinal side of plastic sheet 2; the free ends of said thread-like elements 14 are connected together around the longitudinal supporting beams 13a of framework 13 of the covering. Said thread-like elements 14 affixing the covering device to the supporting framework and consisting of the plastic sheet 2 obtained in accordance with the principles of this invention abut against the iron wires 6a of the reinforced longitudinal sides of plastic sheet 2, with the resultant advantage of preventing the plastic sheet from tearing.

I claim:

1. A process of continuously applying tapes from synthetic resin, provided with an armature, on the longitudinal sides of plastic sheets adapted to serve as protective coverings for rows of vines or for floriculture greenhouses, characterized in that it consists in continuously unrolling a plastic sheet from a roller support; in continuously routing said plastic sheet in a plane situated below two extruder heads, one of said extruder heads facing one longitudinal side and the other extruder head facing the other longitudinal side of said plastic sheet; in continuously feeding the extruders of said two extruder heads with thermoplastic material; in continuously extruding through each of said two extruder heads a flexible tubing from plastic sheet; in continuously rolling from a bobbin (one bobbin per extruder head) a metal (preferably iron) wire; in continuously feeding said iron wire into said flexible tubing from plastic sheet; in routing said flexible tubing from extruded plastic sheet (one tubing for each of said two extruder heads) with the iron wire inserted therein simultaneously on one and the other of the two longitudinal sides of the plastic sheet; in passing said flexible plastic tubing (applied with the iron wire inserted therein on one and the other of the two longitudinal sides of the plastic sheet) below a punch synchronized to function with the feed of the plastic sheet and punching on the side lying on the inside with respect to the iron wire inserted into the plastic flexible tubing, at specified intervals, holes or eyelets in said flexible plastic tubing and in the underlying plastic sheet on which said flexible tubing is applied; in routing said plastic sheet (with the flexible plastic tubing applied in the form of a tape with the iron wire inserted therein on one and the other of its two longitudinal sides) between pressure rollers so as to bring about the cohesion; in continuously passing said plastic sheet with the flexible plastic tubing having the iron wire inserted therein and applied in the form of a tape on its two longitudinal sides through a bath of coolant water; and, finally, in continuously rolling said plastic sheet with the flexible plastic tubing having the iron wire inserted therein and applied in the form of a tape on its two longitudinal sides on a receiving-roller type support.

2. The apparatus for continuously applying tapes from synthetic resin, provided with an armature, on the longitudinal sides of plastic sheets adapted to serve as protective coverings for rows of vines or for floriculture greenhouses is essentially characterized in that it consists of a roller support from which the starting plastic sheet is unrolled continuously; a first set of monoplane rollers on which said starting plastic sheet is advanced; at least two extruders in symmetrical face-to-face relationship to one another, one extruder being disposed on one side and the other extruder on the other side of the two longitudinal sides of said starting plastic sheet and whose extruder heads are disposed (one extruder head facing one longitudinal side and the other extruder head facing the other longitudinal side of said starting plastic sheet) above the plane formed by said first set of rollers; at least two punches which are disposed (one punch facing one longitudinal side and the other punch facing the other longitudinal side of said plastic sheet) above said sides and are preferably in symmetrical face-to-face relationship to one another and synchronized to function with the advancing movement of said starting plastic sheet; at least one pressure roller to provide pressure in conjunction with one of the rollers of said first set of rollers; a second set of rollers to feed said plastic sheet and lying in a plane lower than the plane in which are disposed the rollers of said first set of rollers and which are situated in a tank containing coolant water; at least one additional roller to feed said plastic sheet and lying in a plane higher than the plane in which the rollers of said second set of rollers are located; and, finally, an additional roller support on which the plastic sheet is rolled continuously once the process is completed, the roller of said additional roller support being driven by a motive force.

* * * * *